(12) United States Patent
Groves et al.

(10) Patent No.: US 11,890,744 B2
(45) Date of Patent: Feb. 6, 2024

(54) WORKBENCH-HAND TRUCK ASSEMBLY

(71) Applicant: TECHTRONIC CORDLESS GP, Anderson, SC (US)

(72) Inventors: Jeffrey Groves, Greenville, SC (US); Tyler H. Knight, Greenville, SC (US); Stephen A. Hughett, Anderson, SC (US)

(73) Assignee: Techtronic Cordless GP, Anderson, SC (US)

( * ) Notice: Subject to any disclaimer, the term of this patent is extended or adjusted under 35 U.S.C. 154(b) by 107 days.

(21) Appl. No.: 17/386,707

(22) Filed: Jul. 28, 2021

(65) Prior Publication Data

US 2022/0032445 A1 Feb. 3, 2022

Related U.S. Application Data

(60) Provisional application No. 63/059,255, filed on Jul. 31, 2020.

(51) Int. Cl.
*B25H 1/04* (2006.01)
*B62B 1/12* (2006.01)

(52) U.S. Cl.
CPC ............. *B25H 1/04* (2013.01); *B62B 1/12* (2013.01); *B62B 2206/006* (2013.01)

(58) Field of Classification Search
CPC .... B25H 1/04; B25H 1/16; B62B 1/12; B62B 2206/006
See application file for complete search history.

(56) References Cited

U.S. PATENT DOCUMENTS

| 3,931,751 A | | 1/1976 | Simonson | |
|---|---|---|---|---|
| 4,199,135 A | * | 4/1980 | Wohrle | B25H 1/08 269/252 |
| 4,269,096 A | | 5/1981 | Boone | |
| 4,498,662 A | * | 2/1985 | Halter | B25H 1/10 269/283 |

(Continued)

FOREIGN PATENT DOCUMENTS

| AU | 719723 B1 | 5/2000 |
|---|---|---|
| CN | 2120743 U | 11/1992 |

(Continued)

OTHER PUBLICATIONS

Extended European Search Report for Application No. 21188431.7 dated Dec. 17, 2021 (9 pages).

*Primary Examiner* — Don M Anderson
*Assistant Examiner* — Christopher Soto
(74) *Attorney, Agent, or Firm* — Dority & Manning, P.A.

(57) ABSTRACT

A workbench-hand truck assembly includes a first pair of legs, a frame, a second pair of legs pivotally coupled to the frame and to the first pair of legs, a workbench configured to be supported by the first and second pairs of legs, a pair of brackets pivotally coupled to the first pair of legs, and a nose plate pivotally coupled to the pair of brackets for movement between a stored position, in which the nose plate extends parallel to and adjacent the workbench, and a deployed position, in which the nose plate extends away from the workbench. The workbench-hand truck assembly is configurable in a hand truck position when the nose plate is in the deployed position, such that the nose plate extends perpendicular to the workbench.

16 Claims, 17 Drawing Sheets

(56) References Cited

U.S. PATENT DOCUMENTS

| | | | |
|---|---|---|---|
| 4,555,099 A * | 11/1985 | Hilton | B25H 1/08 269/208 |
| 4,726,405 A * | 2/1988 | Bassett | B23Q 1/74 144/287 |
| 4,860,807 A | 8/1989 | Vacchiano | |
| 4,969,496 A | 11/1990 | Romans | |
| 5,067,535 A | 11/1991 | Wolff | |
| 5,536,034 A | 7/1996 | Miller | |
| 5,642,895 A | 7/1997 | Wunder | |
| 5,957,472 A * | 9/1999 | Borgatti | B62B 1/12 280/30 |
| 6,131,926 A * | 10/2000 | Harlan | B62B 1/14 280/47.27 |
| 6,152,462 A | 11/2000 | Barrett | |
| 6,328,319 B1 | 12/2001 | Stahler, Sr. | |
| 6,345,829 B1 | 2/2002 | Mueller | |
| 6,360,797 B1 | 3/2002 | Brazell et al. | |
| 6,412,964 B2 | 7/2002 | Hattori et al. | |
| 6,523,583 B1 | 2/2003 | Ruiz | |
| 6,578,856 B2 | 6/2003 | Kahle | |
| 6,634,631 B2 | 10/2003 | Hebert | |
| 6,702,608 B2 | 3/2004 | Brennan, Jr. | |
| D489,858 S | 5/2004 | Hay et al. | |
| 6,769,674 B2 | 8/2004 | Chang | |
| 6,848,684 B2 | 2/2005 | Fortin et al. | |
| 6,886,836 B1 | 5/2005 | Wise | |
| D509,939 S | 9/2005 | Hay et al. | |
| 6,942,229 B2 | 9/2005 | Brazell et al. | |
| 6,976,744 B2 | 12/2005 | Hay et al. | |
| D524,506 S | 7/2006 | Hay et al. | |
| 7,077,421 B2 | 7/2006 | Wu | |
| 7,090,210 B2 | 8/2006 | Lawrence et al. | |
| 7,198,511 B2 | 4/2007 | Brennan, Jr. | |
| 7,213,829 B2 | 5/2007 | Wu | |
| 7,331,596 B2 | 2/2008 | Tiramani et al. | |
| D566,735 S | 4/2008 | Wise | |
| 7,380,778 B2 | 6/2008 | Lawrence et al. | |
| 7,387,306 B2 | 6/2008 | Zimmer | |
| 7,445,216 B1 | 11/2008 | Chou | |
| 7,448,608 B2 | 11/2008 | Radermacher | |
| 7,458,403 B2 | 12/2008 | Radermacher | |
| 7,543,614 B2 | 6/2009 | Wise | |
| 7,588,255 B2 | 9/2009 | Katz | |
| 7,647,956 B1 | 1/2010 | Cona et al. | |
| 7,648,155 B1 | 1/2010 | Wise | |
| 7,690,408 B2 | 4/2010 | Sugiura | |
| 7,726,669 B2 | 6/2010 | Alexander | |
| 7,731,205 B2 | 6/2010 | Wise | |
| 7,819,111 B2 | 10/2010 | Wise | |
| 7,971,898 B2 | 7/2011 | Wise | |
| 8,042,794 B2 | 10/2011 | Marshall et al. | |
| 8,047,553 B2 | 11/2011 | Voong | |
| 8,096,519 B2 | 1/2012 | Tam et al. | |
| 8,152,149 B2 | 4/2012 | Awrence et al. | |
| 8,157,337 B2 | 4/2012 | Manalang et al. | |
| 8,191,906 B2 | 6/2012 | Jensen | |
| 8,231,119 B2 | 7/2012 | Marshall et al. | |
| 8,313,076 B2 | 11/2012 | Tam et al. | |
| 8,448,956 B2 | 5/2013 | Wise | |
| 8,517,067 B2 | 8/2013 | Barnhill | |
| 8,602,378 B2 | 12/2013 | Tam et al. | |
| 8,740,207 B2 | 6/2014 | Awrence et al. | |
| 8,910,970 B2 | 12/2014 | Chen | |
| D721,108 S | 1/2015 | Wise | |
| 8,936,259 B2 | 1/2015 | Tsai | |
| 9,050,718 B2 | 6/2015 | Cole | |
| 9,050,992 B2 | 6/2015 | Smith | |
| 9,150,233 B2 | 10/2015 | Su | |
| 9,186,736 B1 | 11/2015 | Chang | |
| 9,254,856 B2 | 2/2016 | Oachs | |
| 9,289,896 B2 | 3/2016 | Cole | |
| 9,358,679 B2 | 6/2016 | Maes | |
| 9,376,130 B1 | 6/2016 | Wise | |
| 9,393,980 B2 * | 7/2016 | Busser | B62B 1/14 |
| 9,403,546 B1 | 8/2016 | Su | |
| 9,446,509 B2 | 9/2016 | Martin | |
| 9,586,128 B2 | 3/2017 | Condoianis et al. | |
| 9,616,907 B1 | 4/2017 | Gibson | |
| 9,623,550 B2 | 4/2017 | Cole | |
| 9,630,312 B2 | 4/2017 | Grela et al. | |
| 9,738,295 B1 | 8/2017 | Horowitz | |
| 9,810,571 B1 | 11/2017 | Su | |
| 9,895,797 B2 | 2/2018 | Smith | |
| 9,914,209 B2 | 3/2018 | Grela et al. | |
| 10,040,466 B1 | 8/2018 | Su | |
| 10,118,631 B2 | 11/2018 | Gunther | |
| 10,279,241 B1 * | 5/2019 | Lurie | B62B 1/008 |
| 10,362,865 B2 | 7/2019 | Cole | |
| 11,027,411 B2 | 6/2021 | Van Bergen et al. | |
| 2004/0104560 A1 | 6/2004 | Tedesco | |
| 2004/0187666 A1 | 9/2004 | Huang | |
| 2004/0250901 A1 | 12/2004 | Ursell et al. | |
| 2005/0093258 A1 | 5/2005 | Brazell et al. | |
| 2005/0199768 A1 | 9/2005 | Tam et al. | |
| 2005/0212236 A1 | 9/2005 | Tiramani et al. | |
| 2007/0012826 A1 | 1/2007 | Liu et al. | |
| 2008/0078893 A1 | 4/2008 | Chianale | |
| 2008/0115701 A1 | 5/2008 | Sugiura | |
| 2008/0196632 A1 | 8/2008 | Achterberg et al. | |
| 2009/0096181 A1 | 4/2009 | Cole, Jr. et al. | |
| 2010/0001450 A1 | 1/2010 | Marshall et al. | |
| 2010/0096530 A1 | 4/2010 | Chiu | |
| 2010/0213148 A1 | 8/2010 | Chen | |
| 2012/0160886 A1 * | 6/2012 | Henny | B62B 1/14 224/401 |
| 2012/0217727 A1 | 8/2012 | Lee | |
| 2012/0318940 A1 | 12/2012 | Chen | |
| 2015/0048563 A1 | 2/2015 | Billings et al. | |
| 2015/0203136 A1 | 7/2015 | Wang et al. | |
| 2015/0208780 A1 | 7/2015 | Avery | |
| 2016/0167217 A1 | 6/2016 | Chiang et al. | |
| 2016/0257327 A1 | 9/2016 | Gayk, Jr. et al. | |
| 2016/0288361 A1 | 10/2016 | Chang | |
| 2017/0173444 A1 | 6/2017 | Condoianis et al. | |
| 2018/0154511 A1 | 6/2018 | Chou et al. | |
| 2019/0308258 A1 | 10/2019 | Shiel et al. | |
| 2021/0221561 A1 | 7/2021 | Davidian et al. | |
| 2021/0276176 A1 | 9/2021 | Van Bergen et al. | |

FOREIGN PATENT DOCUMENTS

| | | |
|---|---|---|
| CN | 2306155 Y | 2/1999 |
| CN | 2561650 Y | 7/2003 |
| CN | 100509305 C | 7/2009 |
| CN | 201385307 Y | 1/2010 |
| CN | 201923178 U | 8/2011 |
| CN | 202186404 U | 4/2012 |
| CN | 202272023 U | 6/2012 |
| CN | 202987212 U | 6/2013 |
| CN | 203410480 U | 1/2014 |
| CN | 203993824 U | 12/2014 |
| CN | 103407472 B | 3/2016 |
| CN | 103407469 B | 5/2016 |
| CN | 206288036 U | 6/2017 |
| CN | 207496703 U | 6/2018 |
| CN | 109623745 A | 4/2019 |
| CN | 209191975 U | 8/2019 |
| CN | 110576891 A | 12/2019 |
| CN | 210554983 U | 5/2020 |
| DE | 4116351 A1 | 11/1991 |
| EP | 0031414 B1 | 2/1983 |
| EP | 1925406 A1 | 5/2008 |
| EP | 2335883 A2 | 6/2011 |
| EP | 2644303 A1 | 10/2013 |
| EP | 2711141 B1 | 4/2016 |
| ES | 1060465 U | 9/2005 |
| ES | 1063039 U | 9/2006 |
| GB | 806613 A | 12/1958 |
| GB | 1519956 A | 8/1978 |
| GB | 2247612 A | 3/1992 |
| GB | 2442713 A | 4/2008 |
| WO | 2017146559 A1 | 8/2017 |

(56) References Cited

FOREIGN PATENT DOCUMENTS

| WO | 2019228646 A1 | 12/2019 | | |
|---|---|---|---|---|
| WO | 2019228649 A1 | 12/2019 | | |
| WO | WO-2020003302 A1 * | 1/2020 | ............. | B62B 1/002 |

* cited by examiner

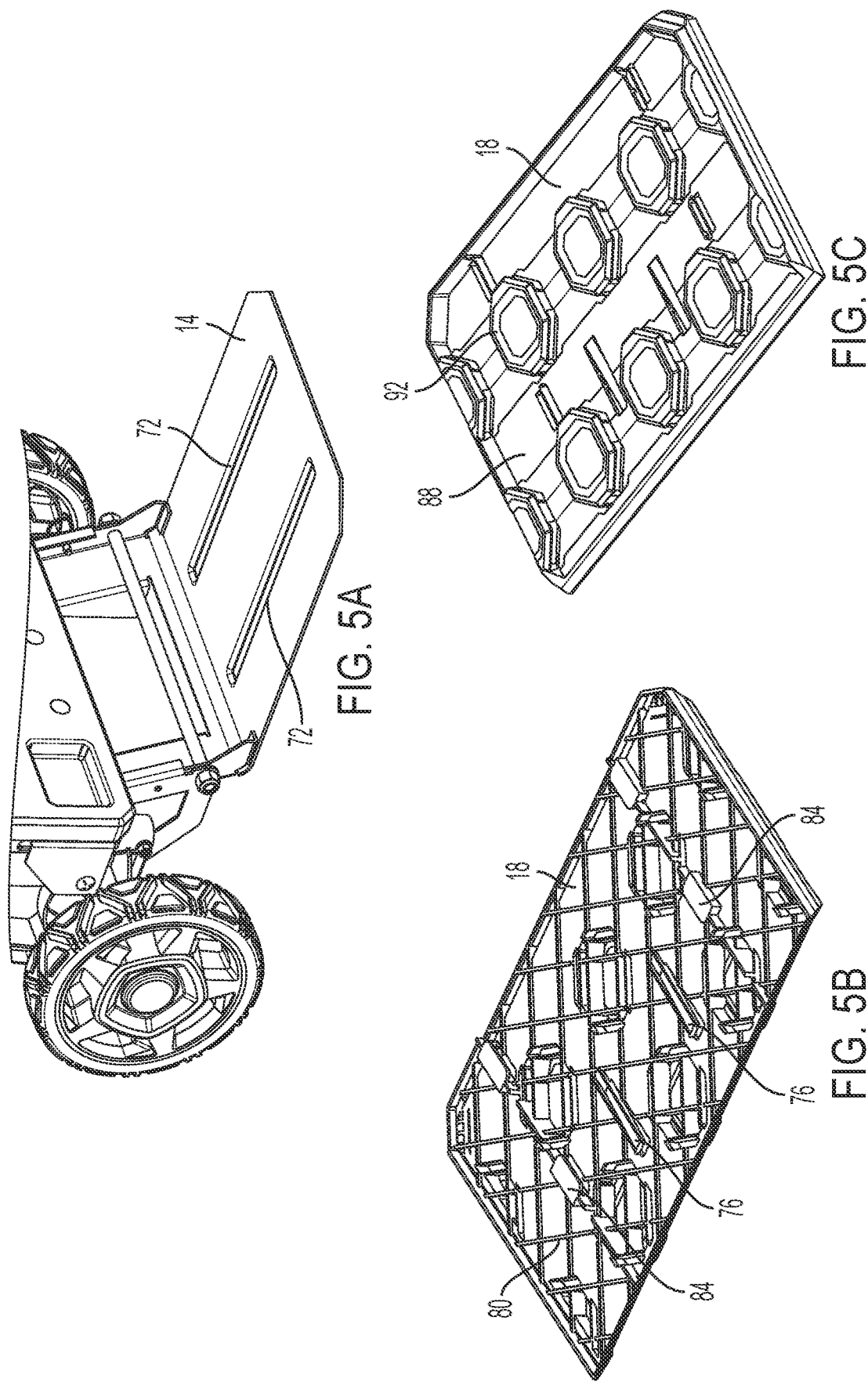

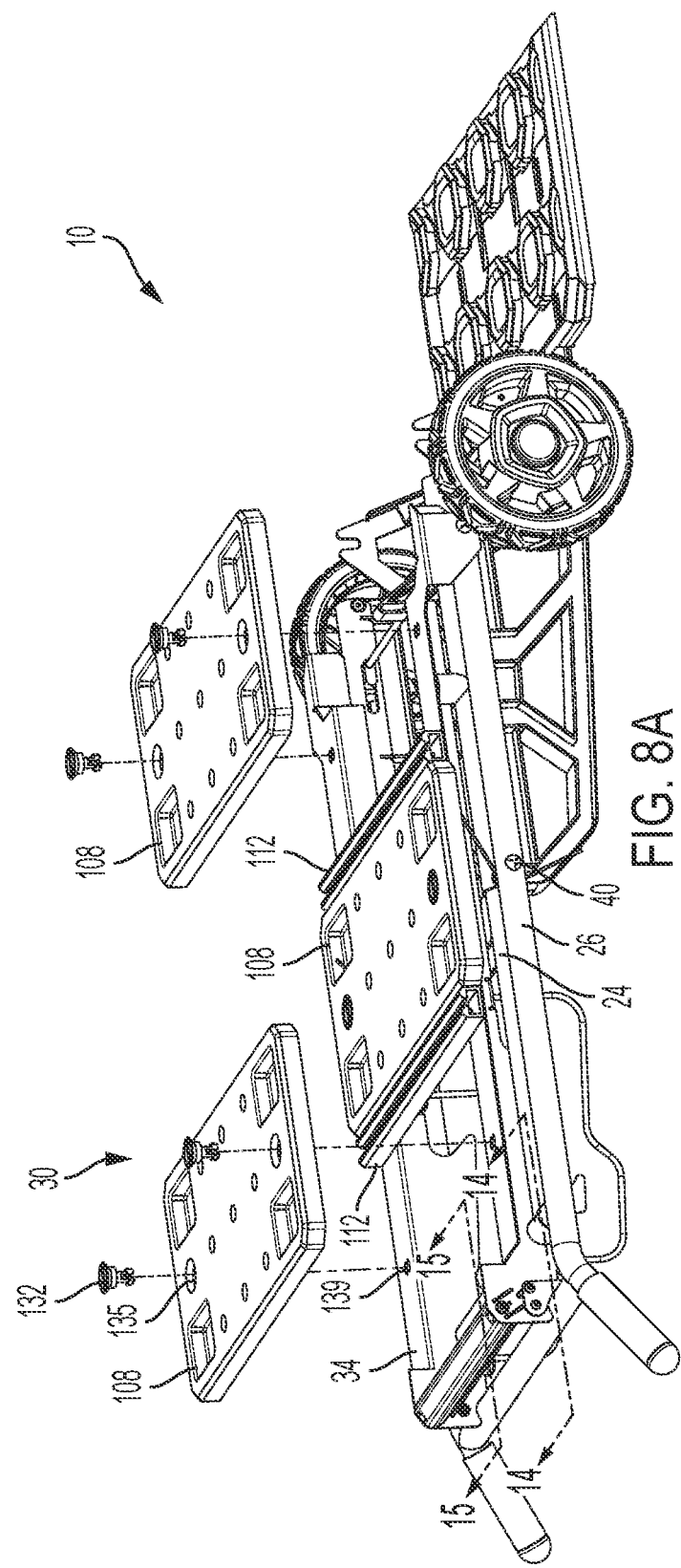
FIG. 8A
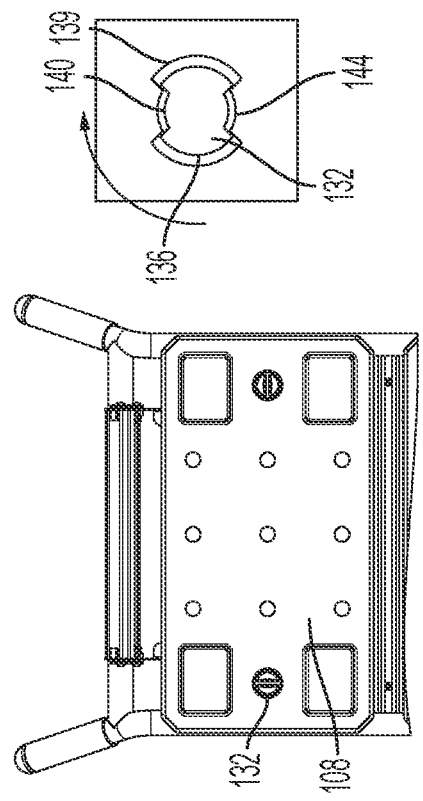
FIG. 8B
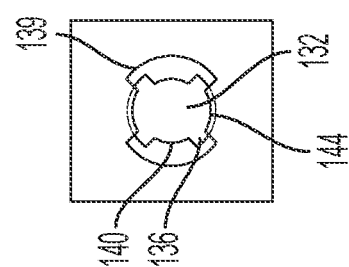

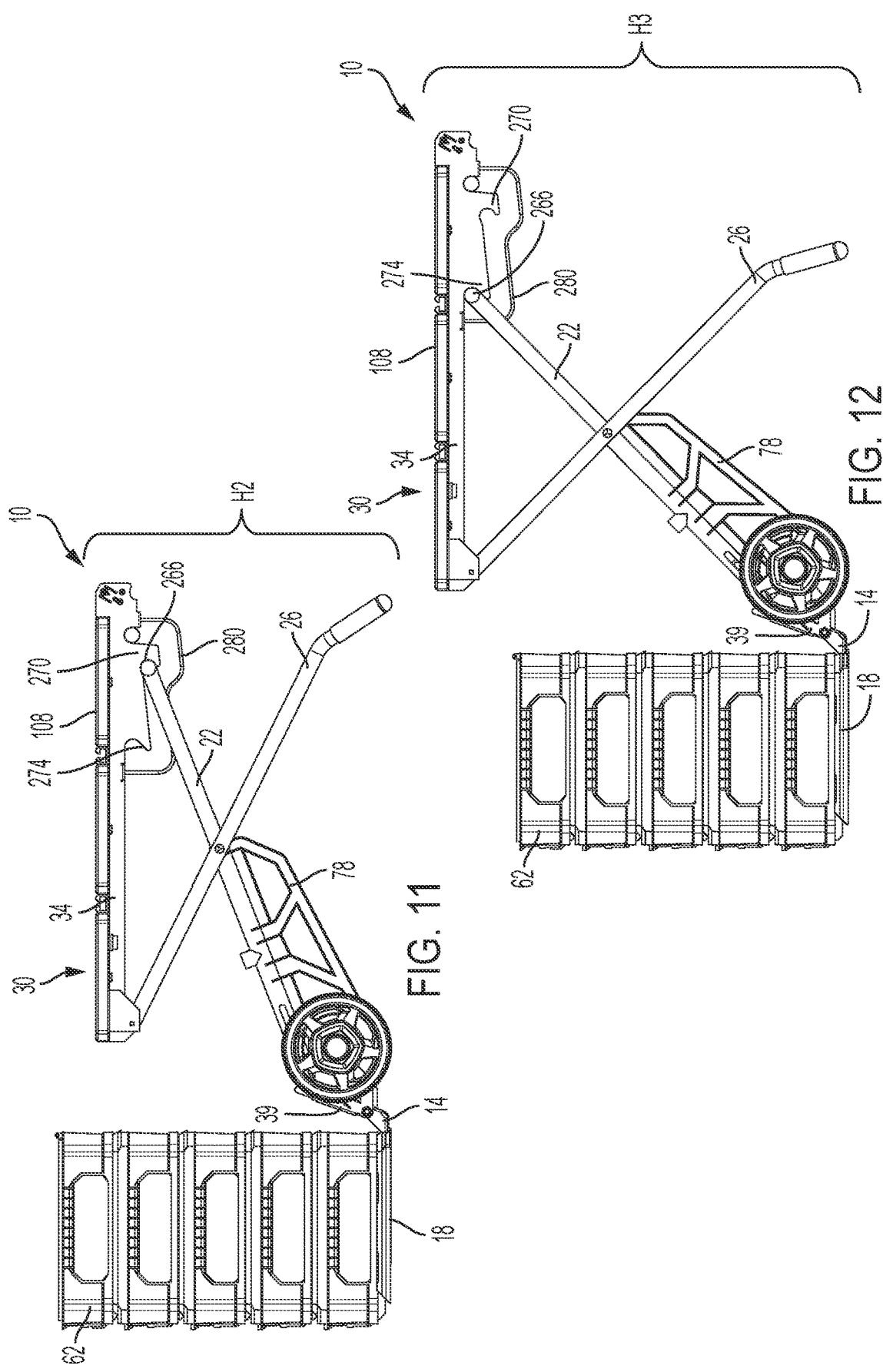

WORKBENCH-HAND TRUCK ASSEMBLY

CROSS-REFERENCE TO RELATED APPLICATIONS

This application claims priority to U.S. Provisional Patent Application No. 63/059,255, filed Jul. 31, 2020, the entire content of which is incorporated herein by reference.

FIELD OF THE DISCLOSURE

The present disclosure relates to hand trucks and work benches.

BACKGROUND

Hand trucks are used to transport items across a surface, and work benches are used to work on workpieces.

SUMMARY

In one independent aspect, a workbench-hand truck assembly includes a first pair of legs, a frame, a second pair of legs pivotally coupled to the frame and to the first pair of legs, a workbench configured to be supported by the first and second pairs of legs, a pair of brackets pivotally coupled to the first pair of legs, and a nose plate pivotally coupled to the pair of brackets for movement between a stored position, in which the nose plate extends parallel to and adjacent the workbench, and a deployed position, in which the nose plate extends away from the workbench. The workbench-hand truck assembly is configurable in a hand truck position when the nose plate is in the deployed position, such that the nose plate extends perpendicular to the workbench.

In another independent aspect, a workbench-hand truck assembly includes a first pair of legs, a frame, a second pair of legs pivotally coupled to the frame and to the first pair of legs, a pair of brackets pivotally coupled to the first pair of legs, a nose plate pivotally coupled to the pair of brackets, and a workbench configured to be supported by the first and second pairs of legs. The workbench is pivotable relative to the pair of brackets and the nose plate between a vertical position and a horizontal position. A locking member is movable between a locked position, in which the locking member retains the workbench in the vertical position, and an unlocked position, in which the workbench is permitted to pivot toward the horizontal position.

In another independent aspect, a workbench-hand truck assembly includes a first pair of legs, a frame, a second pair of legs pivotally coupled to the frame and to the first pair of legs, a pair of brackets pivotally coupled to the first pair of legs, a nose plate pivotally coupled to the pair of brackets, and a workbench configured to be supported by the first and second pairs of legs. The workbench is pivotable relative to the pair of brackets and the nose plate between a vertical position and a horizontal position, and, when the workbench is in the horizontal position, the first pair of legs and the second pair of legs are movable between a first position, in which the workbench is positioned at a first height above a ground surface, and a second position, in which the workbench is positioned at a second height above the ground surface that is greater than the first height. A latch member is movable between a latched position, in which the latch member retains the first pair of legs and the second pair of legs in the first position, and an unlatched position, in which the first pair of legs and the second pair of legs are movable toward the second position.

Other features and aspects of the disclosure will become apparent by consideration of the following detailed description and accompanying drawings.

BRIEF DESCRIPTION OF THE DRAWINGS

FIG. 5A is an enlarged perspective view illustrating the nose plate of the workbench-hand truck assembly of FIG. 1 in the hand truck position, with a skid platform removed.

FIG. 5B is a bottom perspective view of a skid platform configured to be coupled to the nose plate of FIG. 5A.

FIG. 5C is a top perspective view of the skid platform of FIG. 5B.

FIG. 8A is a perspective view of the workbench-hand truck assembly of FIG. 1 in a low-table position, illustrating removable table sections.

FIG. 8B illustrates a lock mechanism for a table section, such as one of the table sections of FIG. 8A.

FIG. 11 is a side view of the workbench-hand truck assembly of FIG. 1 in an intermediate-table position.

FIG. 12 is a side view of the workbench-hand truck assembly of FIG. 1 in a high-table position.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
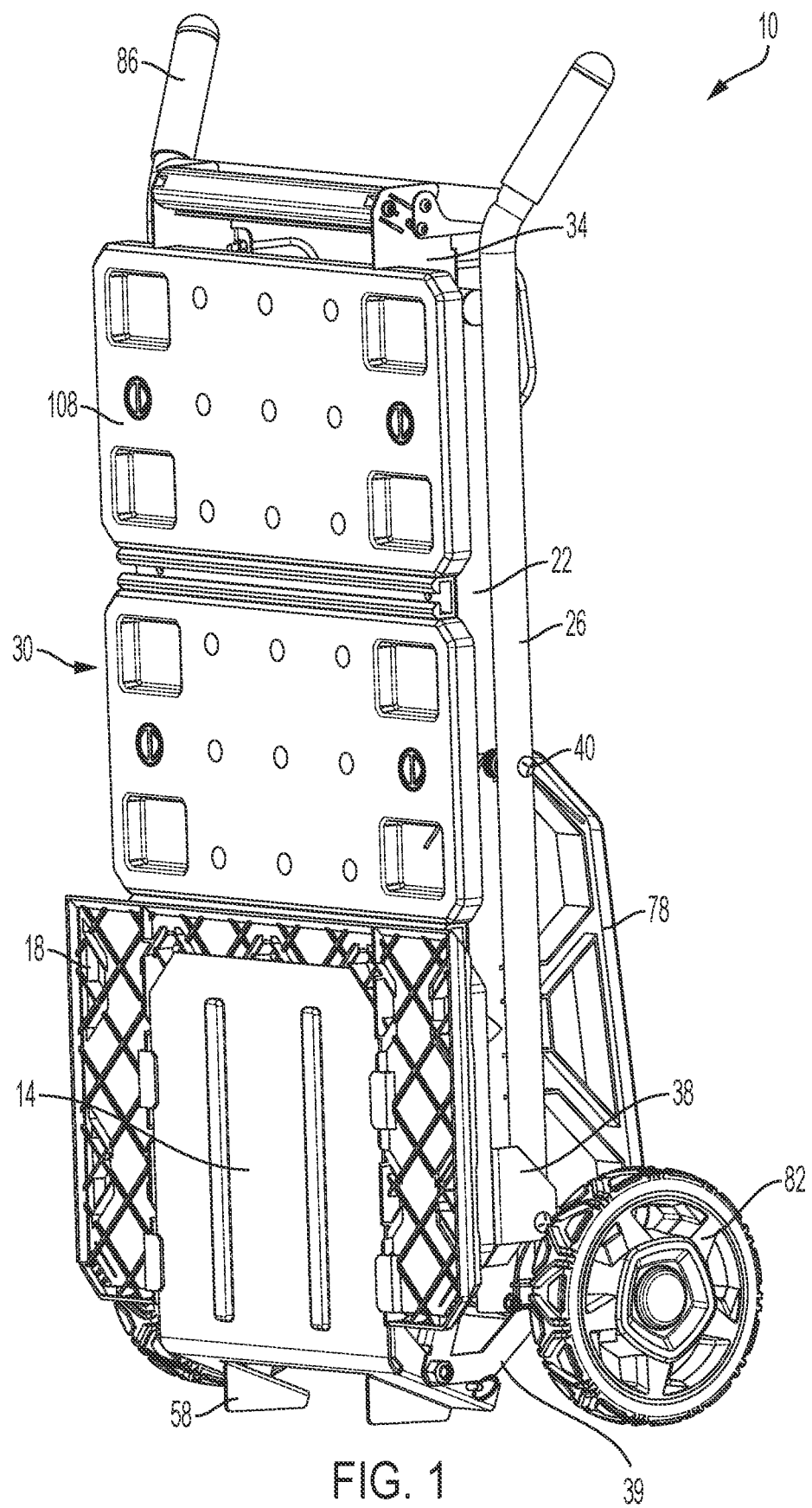
FIG. 1 is perspective view of a workbench-hand truck assembly according to an embodiment of the present disclosure and illustrated in a storage position.
Figure 2:
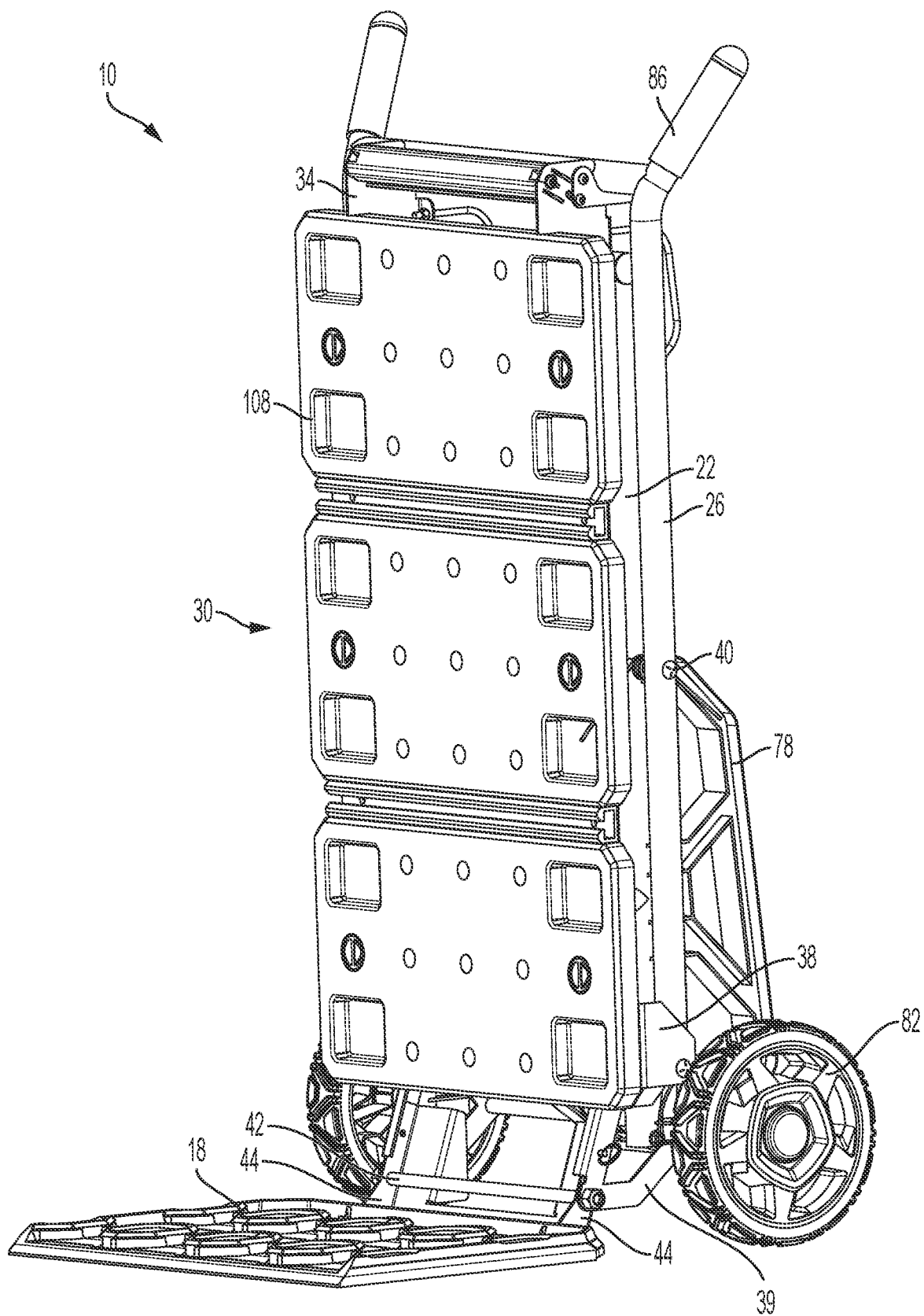
FIG. 2 is a perspective view of the workbench-hand truck assembly of FIG. 1 in a hand truck position.

FIGS. 1-2 illustrate a workbench-hand truck assembly 10 including a nose plate 14, a skid platform 18 that is removably coupled to the nose plate 14, a first pair of legs 22, a second pair of legs 26, and a workbench 30 supported by a frame 34. The frame 34 includes a pair of first brackets 38 at its lower end (with reference to the orientation illustrated in FIGS. 1-2). Each of the second pair of legs 26 is pivotally coupled to a respective first bracket 38. The first legs 22 are pivotally coupled to the second legs 26 by respective pivot pins 40.

In the illustrated embodiment, the nose plate pivotally coupled to a pair of second brackets 39, which are separate from the frame 34. More specifically, the nose plate 14 is coupled to a pivot shaft 42 extending between the second brackets 39 and through a pair of arms 44 of the nose plate 14. As such, the nose plate 14 may be pivoted about an axis 46 (FIG. 3) defined by the pivot shaft 42. The illustrated nose plate 14 is pivotable between a storage position (FIGS. 1 and 3), in which the nose plate 14 and skid platform 18 are positioned adjacent the workbench 30 and extend parallel to the workbench 30, and a deployed position (FIG. 2), in which the nose plate 14 and skid platform 18 extend generally away from the workbench 30.

Figure 3:
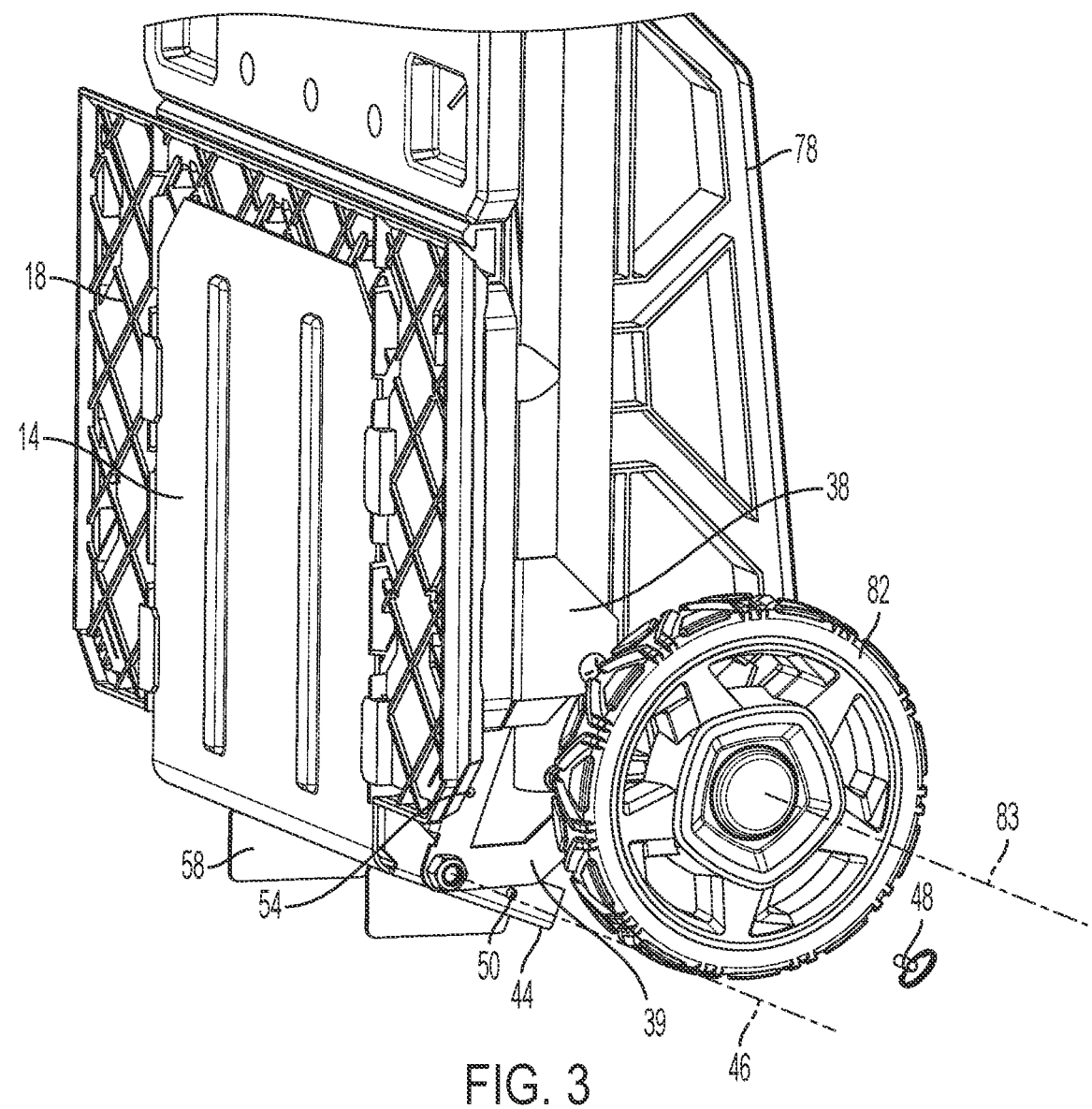
FIG. 3 is an enlarged perspective view illustrating a nose plate of the workbench-hand truck assembly of FIG. 1 in the storage position.

Referring to FIG. 3, a locking pin 48 may be inserted into a first aperture 50 in one of the arms 44 of the nose plate 14 to retain the nose plate 14 in the storage position. In particular, when the locking pin 48 is positioned in the first aperture 50, the locking pin 48 engages a bottom edge of the bracket 39 to prevent movement of the nose plate 14 toward the deployed positioned. When the locking pin 48 is removed and the nose plate 14 is pivoted to the deployed position, the first aperture 50 aligns with a second aperture 54 in the bracket 39, and the locking pin 48 may be inserted through both the first and second apertures 50, 54 to retain the nose plate 14 in the deployed position. Thus, the locking pin 48 may be used to selectively retain the nose plate 14 in the storage position and the deployed position.

When the nose plate 14 is in the storage position, the overall footprint of the workbench-hand truck assembly 10 is advantageously reduced to facilitate storage and transportation of the workbench-hand truck assembly. In the illustrated embodiment, the nose plate 14 includes a pair of generally triangular plates 58, which may engage the ground to support the workbench-hand truck assembly 10 when the workbench-hand truck assembly 10 is stood upright in the storage position. As described in greater detail below, the nose plate 14 may be used to receive and support one or more items, such as one or more stackable containers 62 (FIG. 6), when the nose plate 14 is in the deployed position to facilitate transporting the item(s).

Figure 4A:
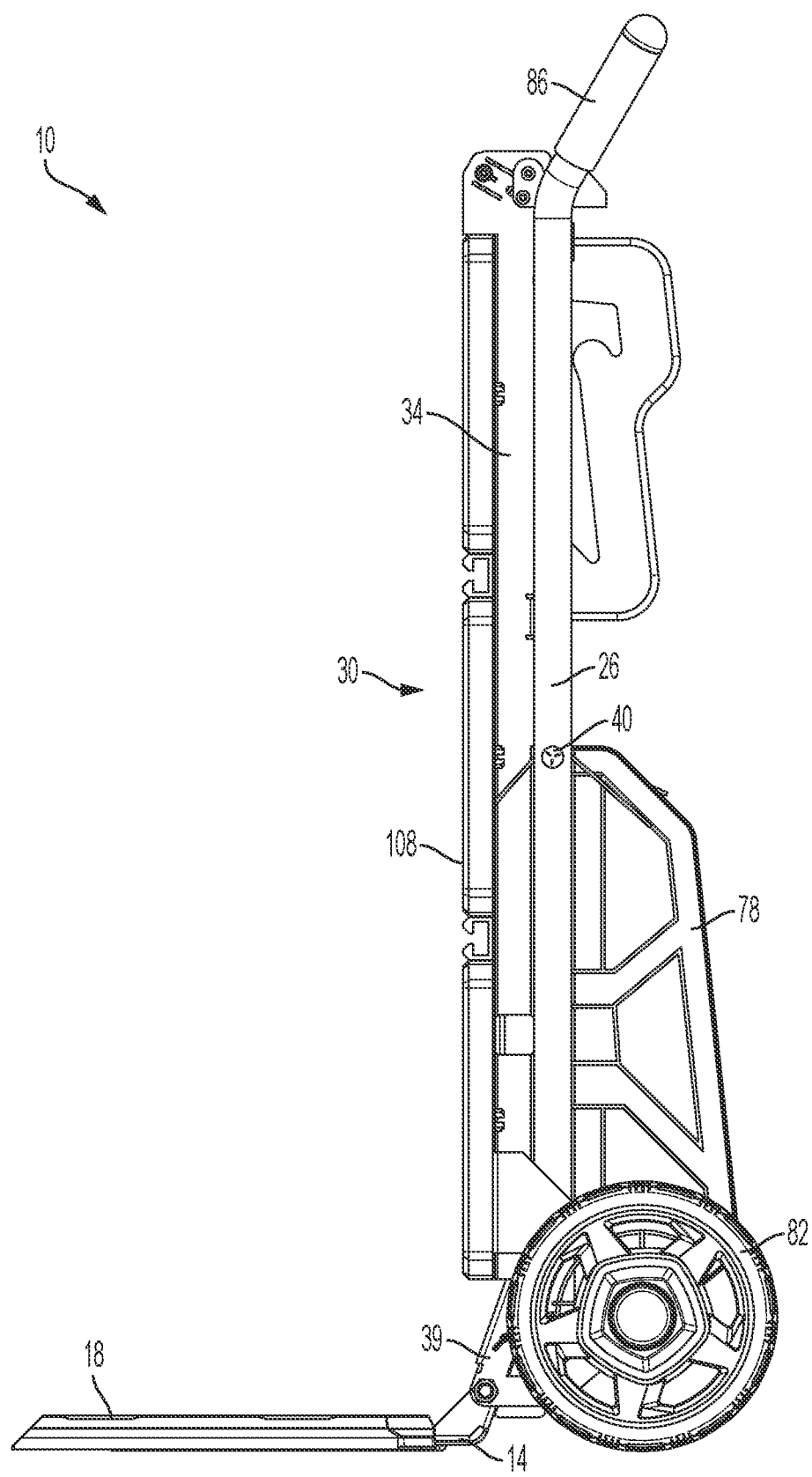
FIG. 4A is a side view of the workbench-hand truck assembly of FIG. 1 in the hand truck position.
Figure 4B:
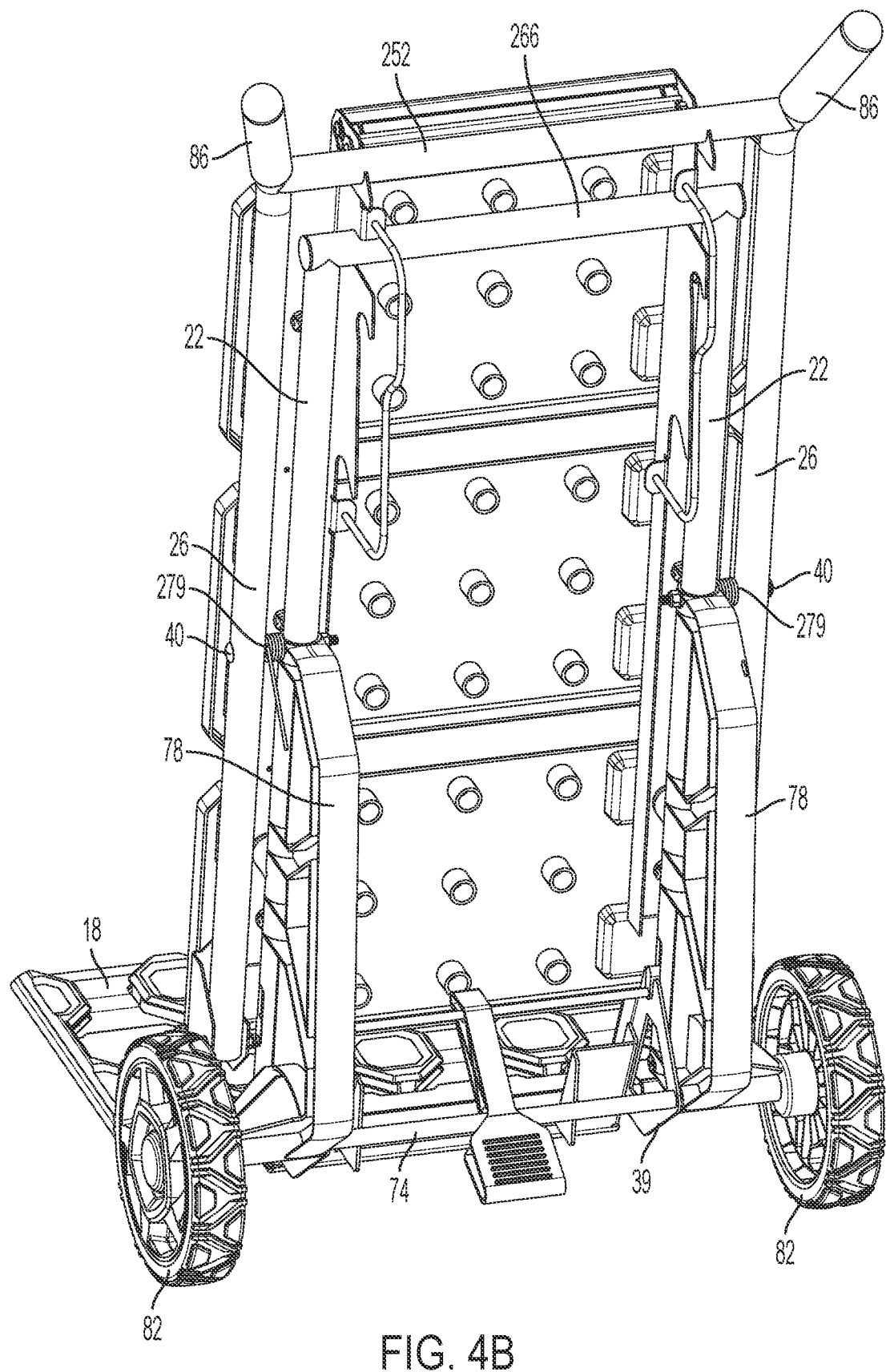
FIG. 4B is a rear perspective view of the workbench-hand truck assembly of FIG. 1.

With reference to FIG. 4B, an axle 74 extends between the first pair of legs 22 and through a pair of base members 78 that are respectively coupled to each of the first pair of legs 22. A pair of wheels 82 is rotatably supported by the axle 74 for rotation about an axis 83 parallel to the axis 46 (FIG. 3). The wheels 82 may have a relatively large diameter, such as between 6-inches and 12-inches or preferably between 8-inches and 10-inches, which facilitates movement of the workbench-hand truck assembly 10 over varied types of terrain.

When the workbench-hand truck assembly 10 is in a hand truck position, as shown in FIGS. 4A-4B, the nose plate 14 is the deployed position and is oriented at approximately a 90-degree angle relative to the workbench 30. Each of the second pair of legs 26 terminates with a handle 86, which can be grasped to roll the workbench-hand truck assembly 10, via the wheels 82, along a surface to transport the storage containers 62 (or other items) on the skid platform 18 or nose plate 14.

Referring to FIGS. 5A-C, the illustrated nose plate 14 includes a pair of slots or grooves 72 configured to receive cantilevered protrusions 76 extending from a lower side 80 of the skid platform 18. The cantilevered protrusions 76 are flexible and may be received within the slots 72 with a snap-fit, such that the skid platform 18 may be removably snapped onto the nose plate 14. In the illustrated embodiment, the lower side 80 may further include a plurality of L-shaped guides 84 configured to receive the lateral sides of the nose plate 14 to guide insertion and removal of the skid platform 18.

Figure 10:
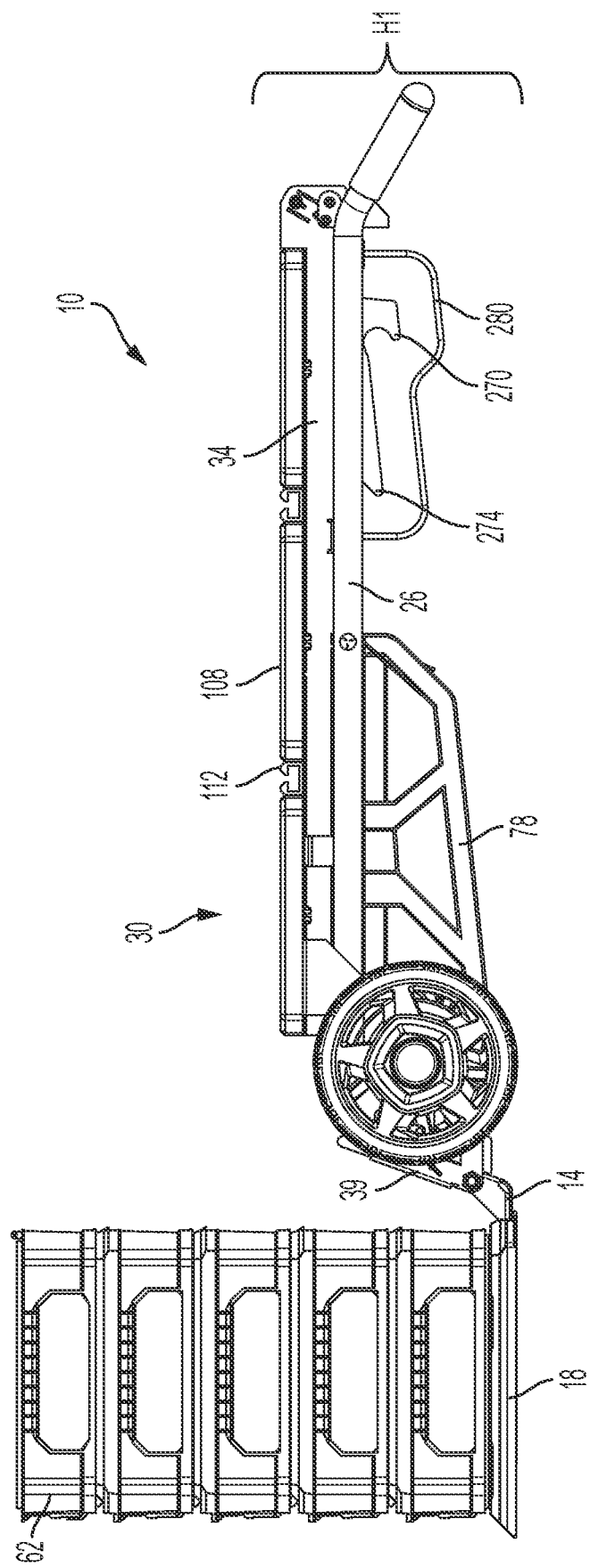
FIG. 10 is a side view of the workbench-hand truck assembly of FIG. 1 in the low-table position.

In the illustrated embodiment, an upper side 88 of the skid platform 18 includes an interface for engaging the storage container 62. For example, the illustrated skid platform 18 includes a plurality of projections or detents 92 that are insertable into a corresponding plurality of recesses 96 formed on a lower side 97 of the storage container 62 (FIG. 6), such that when the storage container 62 is stored on the skid platform 18 and the workbench-hand truck assembly 10 is jostled or bumped, the storage container 62 will not slide off the skid platform 18. As shown in FIG. 10, the skid platform 18 is configured to support a plurality of storage containers 62.

Figure 6:
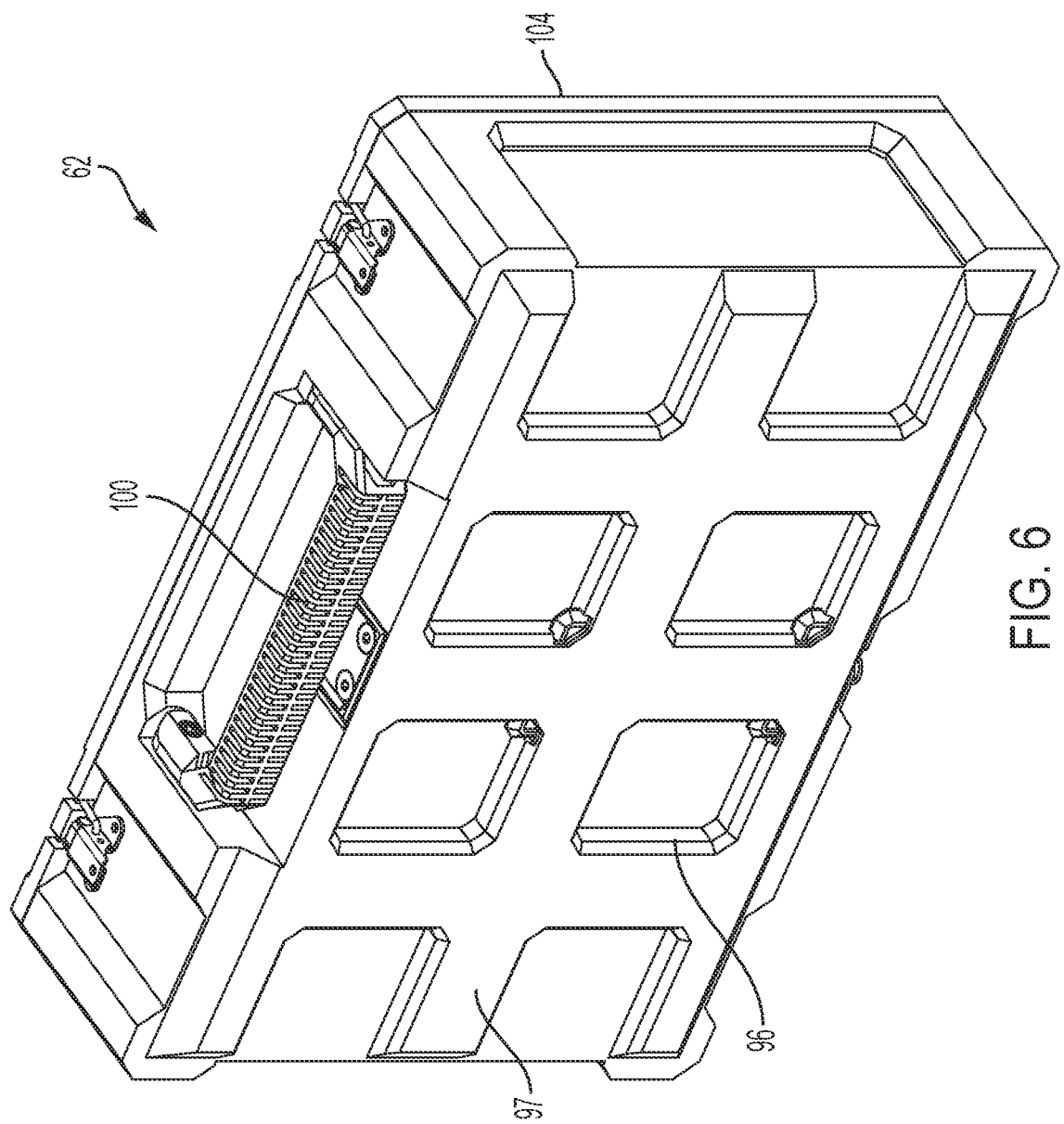
FIG. 6 is a bottom perspective view of a storage container for use with the workbench-had truck assembly of FIG. 1.

Referring to FIG. 6, each storage container 62 has a handle 100 and a lid 104 defining an upper side of the storage container 62. The lid 104 may include a plurality of detents that match the geometry of the detents 92 on the upper side 88 of the skid platform 18 (FIG. 5C), such that the storage containers 62 can be stacked upon one another while being transported by the skid platform 18. In some embodiments, the skid platform 18 and storage containers 62 may have any of the engagement interfaces described in U.S. patent application Ser. No. 17/153,251, filed on Jan. 20, 2021, the entire content of which is incorporated herein by reference.

Figure 7B:
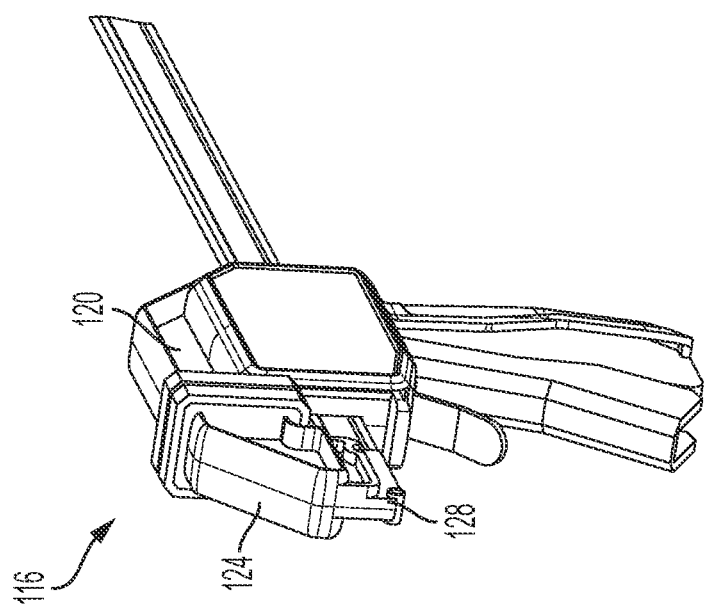
FIG. 7B is a perspective view of a bar clamp able to be coupled to the slot pieces of FIG. 7A.
Figure 7A:
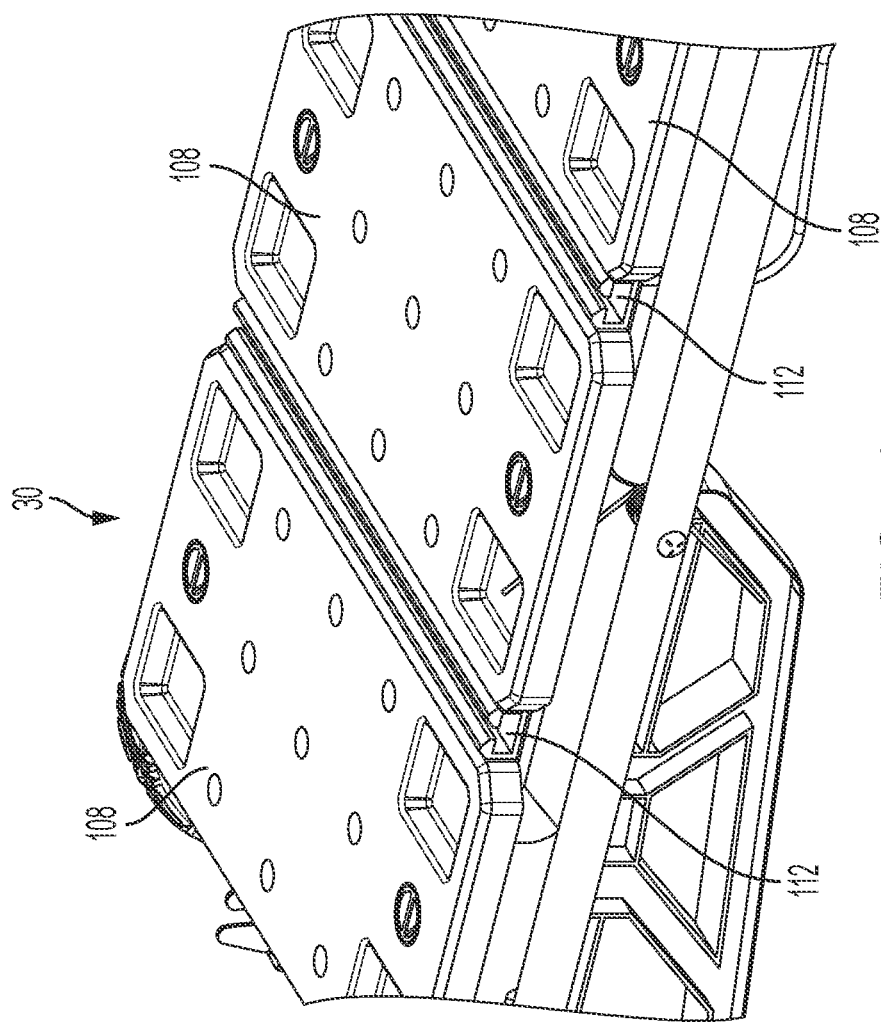
FIG. 7A is an enlarged perspective view illustrating table sections and slot pieces of the workbench-hand truck assembly of FIG. 1.

Referring now to FIGS. 7A-7B, the illustrated workbench 30 includes a plurality of modular table sections 108 and a pair of guide tracks 112 extending across the width of the workbench 30 and positioned between adjacent table sections 108. The guide tracks 112 are each configured to slidably receive and retain a bar clamp 116 (FIG. 7B). More specifically, the illustrated bar clamp 116 includes a fixed jaw 120, a movable jaw 124, and a pin 128 fixed at the bottom leading edge of the movable jaw 124. The pin 128 and guide tracks 112 are configured such that the pin 128 is slidable along one of the guide tracks 112 during clamping, while the guide track 112 retains the bar clamp 116 to the workbench 30. Thus, one or a plurality of bar clamps 116 may be arranged in a working position (i.e. coupled to the workbench 30) to allow a workpiece to be easily clamped and secured to the workbench 30. In some embodiments, the workbench 30 may be configured to receive and retain one or more bar clamps 116 on the underside of the workbench 30 when the clamp(s) 116 are not in use.

With reference to FIGS. 8A-8B, the modular table sections 108 are removably coupled to the frame 34 via, e.g., a plurality of quick-release fasteners 132 inserted through bores 135 in the table sections 108 and into bores 139 on the frame 34. The illustrated quick-release fasteners 132 include locking surfaces 136 offset by 180 degrees and recesses 140 offset by 180 degrees and disposed circumferentially between the respective locking surfaces 136. (FIG. 8B). To couple the modular table sections 108 to the frame 34, the fasteners 132 are rotated such that the locking surfaces 136 are positioned underneath corresponding projections 144 formed in the bores 139 on the frame 34, thereby preventing the fasteners 132 from being withdrawn from the bores 139.

To unlock and decouple the modular table sections 108 from the frame 34, the fasteners 132 are rotated (e.g., by 90 degrees in the illustrated embodiment), to align the recesses 140 with the projections 144. The fasteners 132 may then be withdrawn from the bores 139 of the frame 34 and the table section(s) 108 removed from the frame 34. In other embodiments, another fastening means may be employed to removably couple the table sections 108 to the frame 34.

In the illustrated embodiment, as shown in FIG. 8A, the frame 34 is configured to receive three modular table sections 108, with the guide tracks 112 positioned between adjacent table sections 108. In other embodiments, there could be more or fewer modular table sections 108 coupled to the frame 34.

Figure 9:
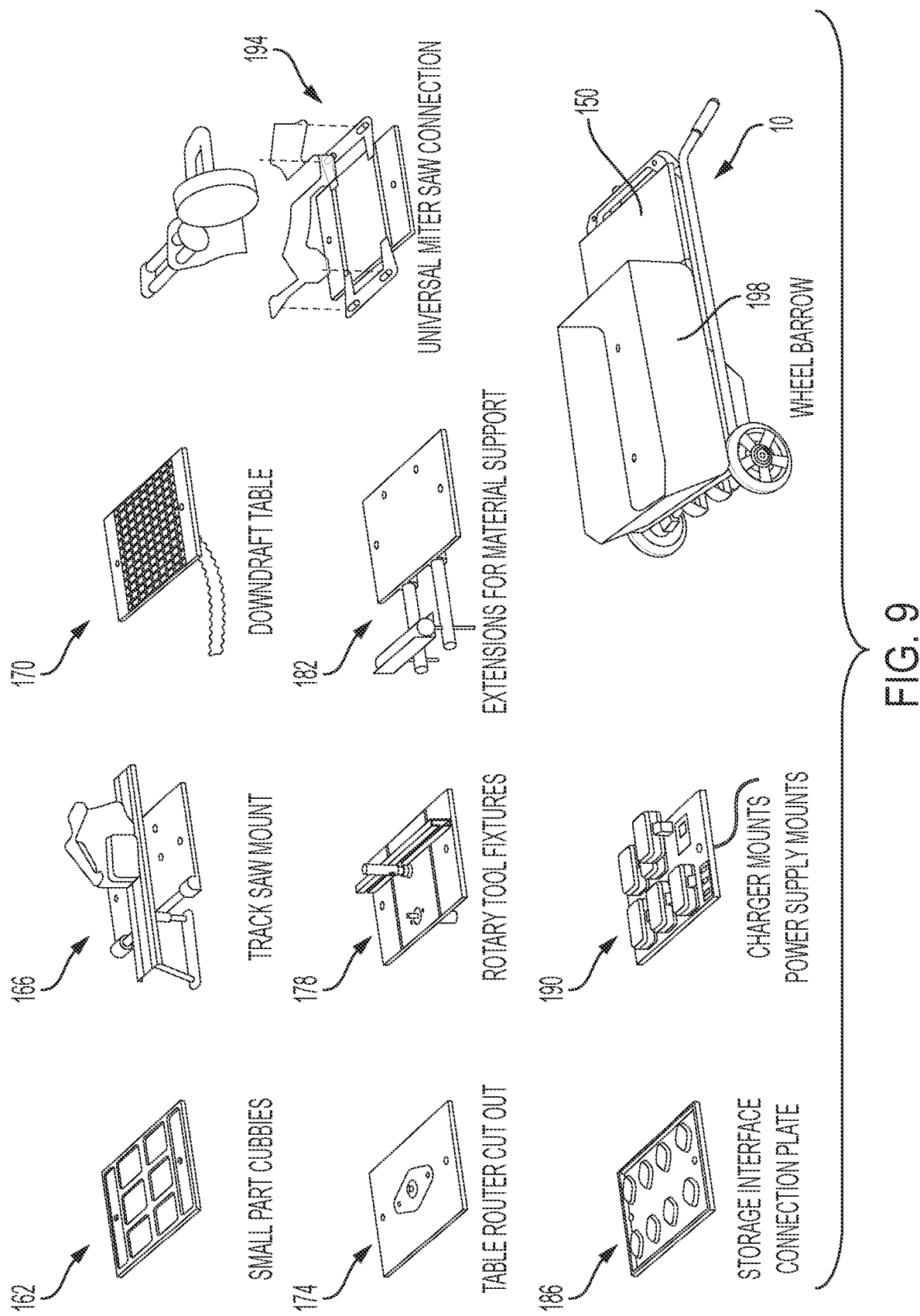
FIG. 9 is a perspective view of a plurality of unique table sections for use with the workbench-hand truck assembly of FIG. 1.

The modular table sections 108 may be interchangeable with a variety of unique table sections to provide the workbench-hand truck assembly 10 with numerous capabilities. For example, as illustrated in FIG. 9, any of the following unique table sections can be coupled to the frame 34 (e.g., via the quick release fasteners 132), depending on the type of operation to be performed with the workbench-hand truck assembly 10: (1) a small part cubbies section 162; (2) a track saw mount section 166; (3) a downdraft table section 170; (4) a table router cut out section 174; (5) a rotary tool fixture section 178; (6) an extension for material support section 182; (7) a storage interface connection plate section 186; (8) a battery pack charger power supply mount section 190; or (9) a universal miter saw connection 194. A wheelbarrow receptacle 198 could also be coupled to the frame 134, and thus the workbench-hand truck assembly 10 could be used as a wheelbarrow. The skid platform 18 may also be coupled to the frame 34, thus allowing one or more of the storage containers 62 to be conveniently stacked on the workbench 30. In addition to the unique table sections listed above, other types of unique modular table sections having different functionality other than those shown and described herein are could be coupled to the frame 34.

With reference to FIGS. 10-12, in addition to the hand truck position, in which the workbench 30 is in a vertical position (i.e. oriented perpendicular to the nose plate 14 and skid platform 18, the workbench 30 and legs 22, 26 may be pivoted about the axle 74 relative to the second brackets 39 and nose plate 14 to a horizontal position (FIGS. 10-12). This allows the illustrated workbench-hand truck assembly 10 to be positioned in a low table position (FIG. 10), an intermediate table position (FIG. 11), and a high table position (FIG. 12). In each of the low, intermediate, and high table positions, the workbench 30 is oriented generally parallel to the nose plate 14 and skid platform 18. In the low table position (FIG. 10), the top surface of the workbench 30 (defined by the modular table sections 108) is positioned at a first height above the ground. In the intermediate table position (FIG. 11), the top surface of the workbench 30 is positioned at a second height H2 above the ground, which is greater than the first height H1, and in the high table position (FIG. 2), the top surface of the workbench 30 is positioned at a third height above the ground, which is greater than the second height H2. In some embodiments, the second height H2 may be between 20 inches and 28 inches, and more specifically 24 inches, and the third height H3 may be between 30 inches and 38 inches, and more specifically 34 inches. The second height H2 in some embodiments may be particularly suitable for using the workbench-hand truck assembly 10 to support a portable table saw, and the third height H3 in some embodiments may be particularly suitable for using the workbench-hand truck assembly 10 to support a portable miter saw.

Because the nose plate 14 is pivotally coupled to the second brackets 39, the nose plate 14 and skid platform 18 may remain stationary during movement of the workbench-hand truck assembly 10 between the hand truck position, the low table position, the intermediate table position, and the high able position. As such, any container(s) 62 or other items supported on the skid platform 18 may advantageously remain in place.

Figure 13:
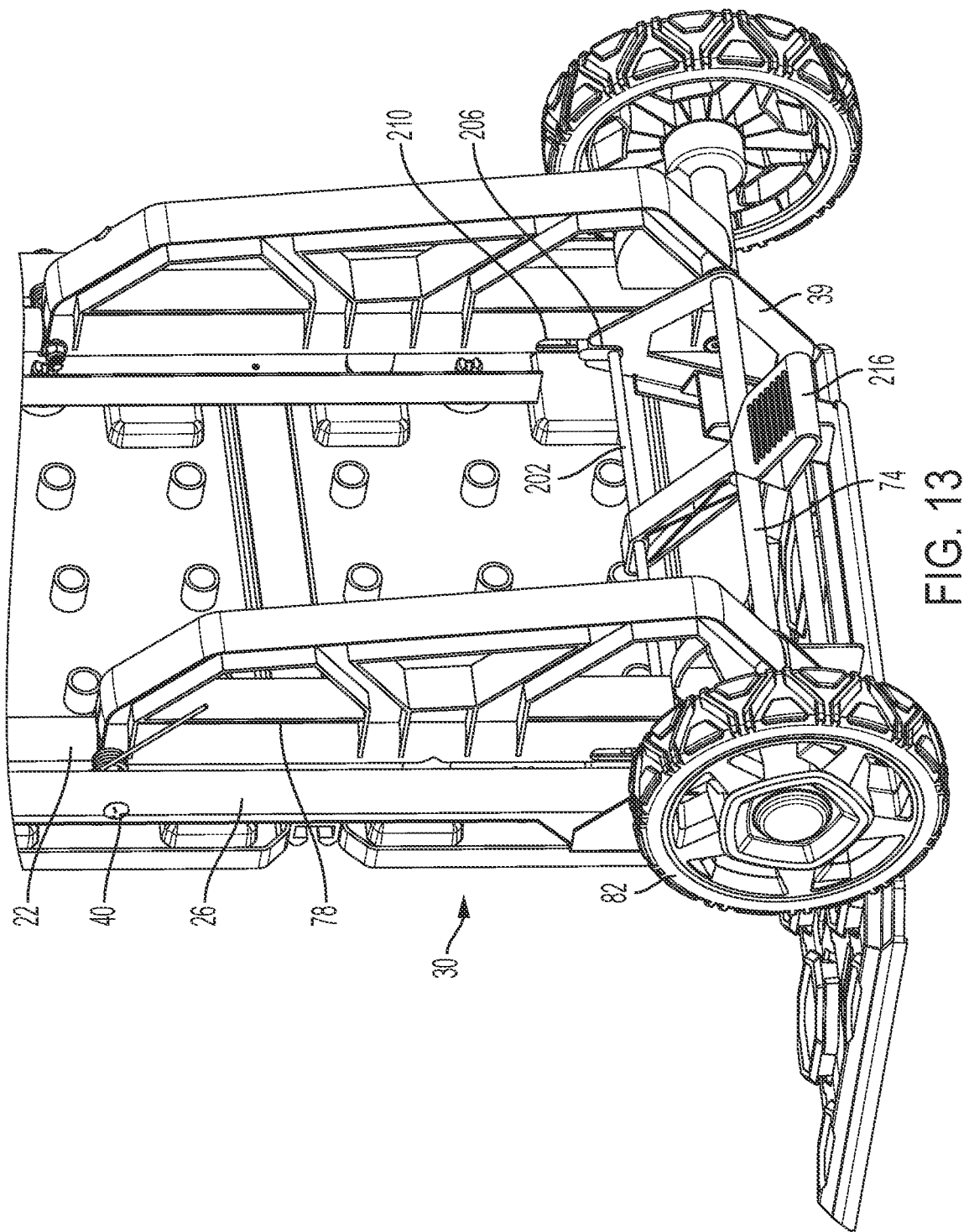
FIG. 13 is an enlarged perspective view of the workbench-hand truck assembly of FIG. 1 illustrating a lock-bar.

As shown in FIG. 13, when the workbench 30 is in the vertical position (e.g., when the workbench-hand truck assembly 10 is in the hand truck position), a locking member such as a lock-bar 202 is arranged within upwardly-facing recesses 206 of each second bracket 39. The lock-bar 202 is moveable along a pair of slots 210 defined in each of the base members 78. When the lock-bar 202 is arranged within the recesses 206 as shown in FIG. 13 in a locked position, the first pair of legs 22 and base members 78 are inhibited from pivoting about the axle 74 toward the horizontal position. However, when the lock-bar 202 is moved up the slots 210 and out of the recesses 206 into an unlocked position, the first pair of legs 22 and base members 78 are then capable of pivoting about the axle 74 toward the horizontal position, (e.g., to arrive the low table position of the workbench-hand truck assembly 10 shown in FIG. 10). As the base members 78 and first pair of legs 22 pivot from the vertical position toward the horizontal position, the second pair of legs 26 and workbench 30 pivot therewith relative to the second brackets 39 and the nose plate 14. In the illustrated embodiment, an actuator in the form of a foot pedal 216 is pivotally coupled to each of the axle 74 and the lock-bar 202. The foot pedal 216 may be depressed by a user's foot to lift the lock-bar 202 from the locked position (FIG. 13) to the unlocked position. One or more biasing members, such as coil springs (not shown) housed within the base members 78, may be coupled to the lock-bar 202 to bias the lock-bar 202 toward the locked position.

Figure 14:
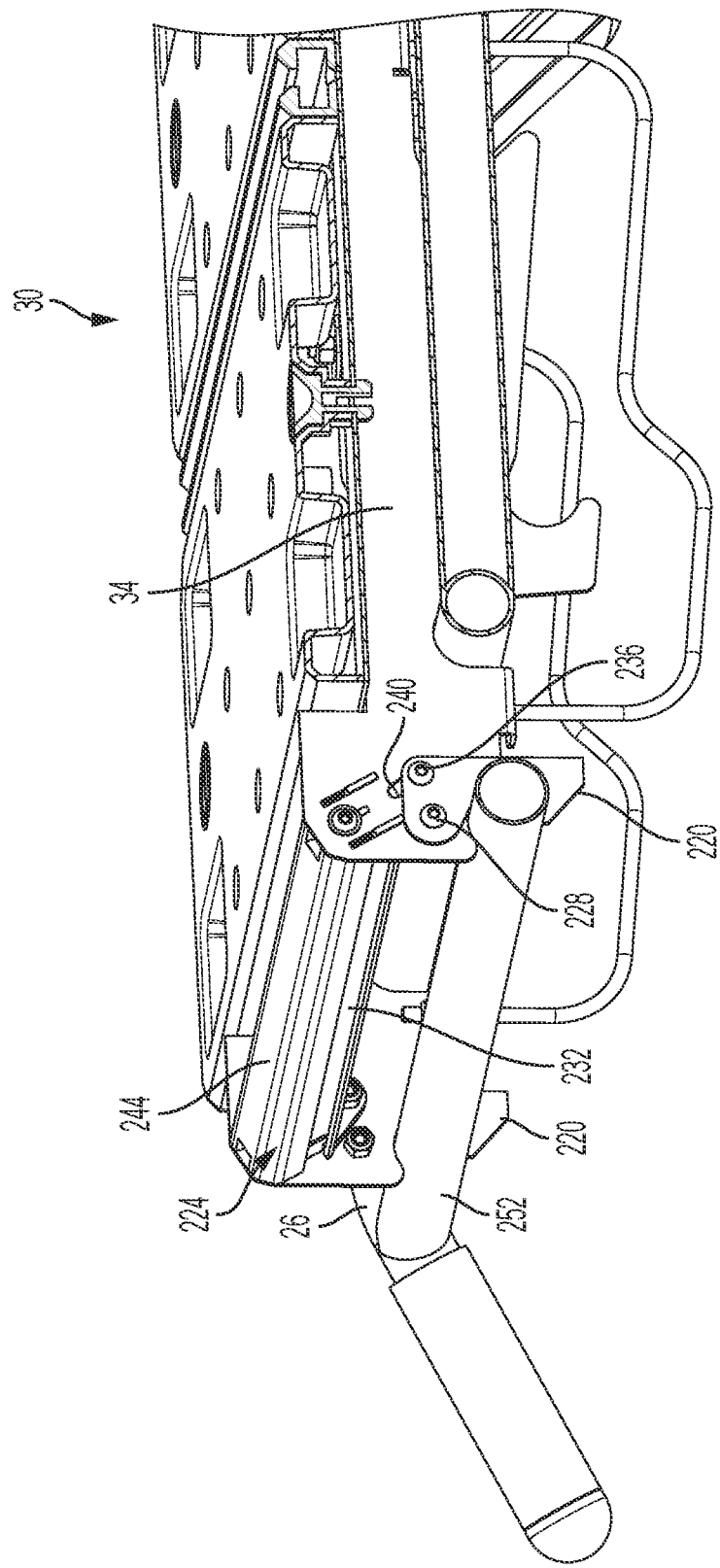
FIG. 14 is an enlarged cross-sectional view taken along line 14-14 in FIG. 8A.
Figure 15:
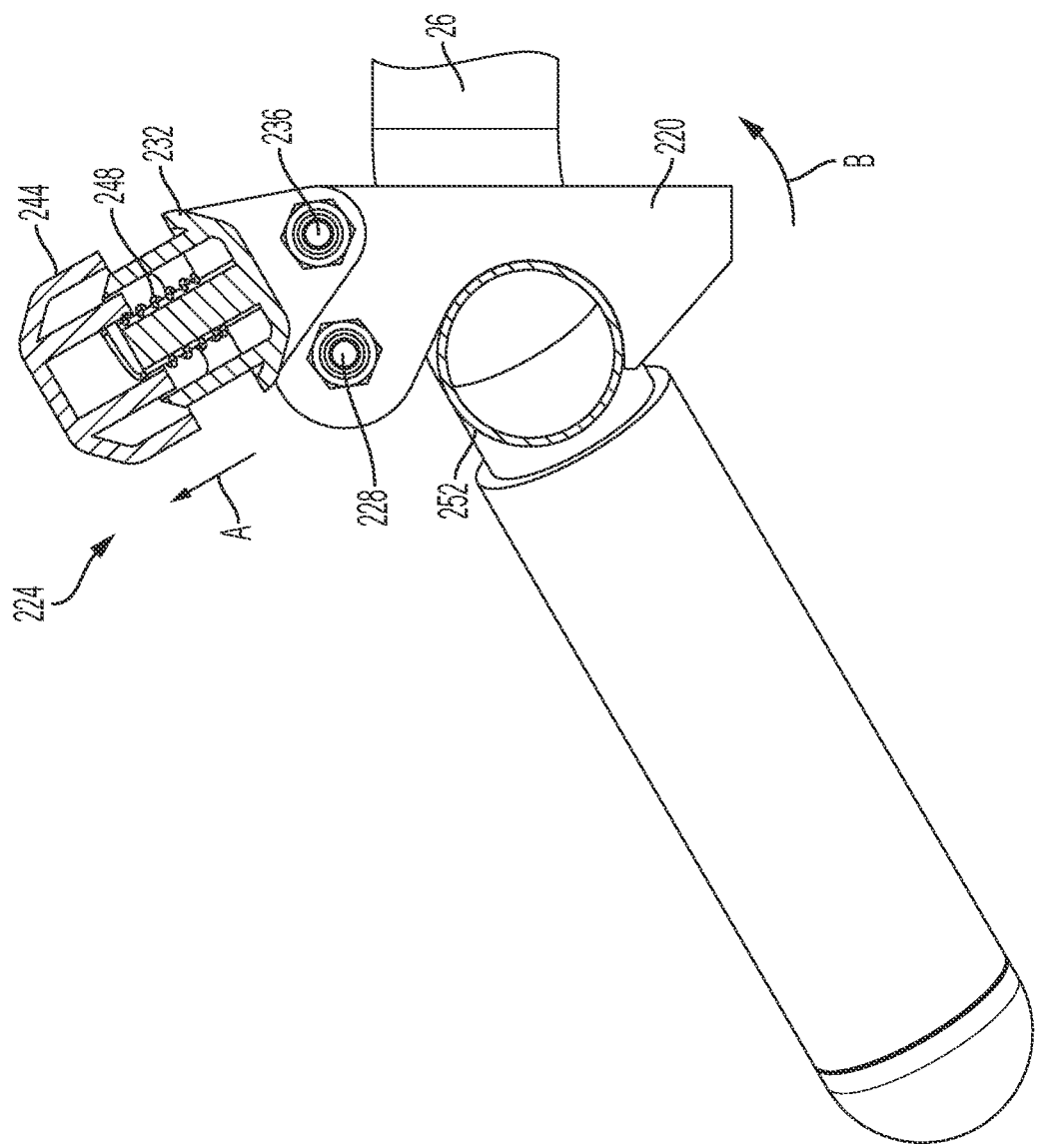
FIG. 15 is an enlarged cross-sectional view taken along line 15-15 in FIG. 8A.

Referring to FIG. 14, the workbench 30 includes a pair of latch members 220 interconnected by a latch handle 224. The latch members 220 are pivotally coupled to the frame 34 by a first pin 228 and are pivotally coupled to a movable portion 232 of the latch handle 224 by a second pin 236, which is slidably disposed within a slot 240 in the frame 34. Accordingly, movement of the movable portion 232 of the latch handle 224 toward a fixed portion 244 of the latch handle 224, in the direction of arrow A in FIG. 15, causes the latch members 220 to pivot about the first pins 228 front a latched position, illustrated in FIGS. 14 and 15, toward an unlatched position in the direction of arrow B.

The movable portion 232 of the latch handle 224 is biased away from the fixed portion 244 by one or more biasing members 248 (e.g., coil springs) positioned between the two portions 232, 244. The biasing members 248 thus also act to bias the latch members 220 toward the latched position illustrated in FIGS. 14 and 15. Referring to FIG. 14, in the latched position, each latch member 220 has a hook portion that engages and inhibits a rod 252 interconnecting the second pair of legs 26 from moving away from the workbench 30. When the workbench-hand truck assembly 10 is in the low table position (FIG. 10), the latch handle 224 can be actuated (e.g., by squeezing the movable portion 232 toward the fixed portion 244), to pivot the latch members 220 from the latched position to the unlatched position, in which the rod 252 is no longer held by the latch members 220. The second pair of legs 26 is then allowed to move downward away from the workbench 30, while the workbench 30 may be simultaneously lifted upwards toward the intermediate table position (FIG. 11). Thus, the latch members 220 in the illustrated embodiment are configured to selectively retain the second pair of legs 26, and thus, the first pair of legs 22 which is pivotally coupled to the second pair of legs 26, against the underside of the workbench 30 when the workbench-hand truck assembly is in the storage position, the hand truck position, and the low table position.

Once the latch members 220 are unlatched and the workbench 30 is lifted upwards, the second pair of legs 26 moves downwards away from the workbench 30 and pivots with respect to the first pair of legs 22 about the pivot pins 40 interconnecting the first and second pairs of legs 22, 26. The first pair of legs 22 therefore also pivots relative to the second brackets 39 and away from the workbench 30. To retain the workbench-hand truck assembly 10 in the intermediate table position, illustrated in FIG. 11, a crossbar 266 interconnecting the first pair of legs 22 is set into a pair of first hooks 270 on the underside of the frame 34 of the workbench 30.

The crossbar 226 can be removed from the first hooks 270 and the workbench may then continue to be moved upward, toward the high table position. In the high table position, the crossbar 226 is received in a pair of second hooks 274 on the underside of the frame 34, to retain the workbench-hand truck assembly 10 in the high-table position. In the illustrated embodiment, the frame 34 includes a pair of bent guide wires 280 configured to guide movement of the crossbar 266 between the respective hooks 270, 274. (FIG. 14). That is, the crossbar 266 is captured between the guide wires 280 and the underside of the workbench 30.

Best illustrated in FIG. 4B, in the illustrated embodiment, torsion springs 279 surround each of the pivot pins 40 interconnecting the first and second pairs of legs 22, 26. The torsion springs 279 bias the workbench 30 upward toward the high table position and therefore provide an assistive lifting force to facilitate movement of the workbench 30 from the low table position toward the high table position. This may be particularly advantageous if the workbench 30 is loaded with heavy tools or other materials.

Figure 16:
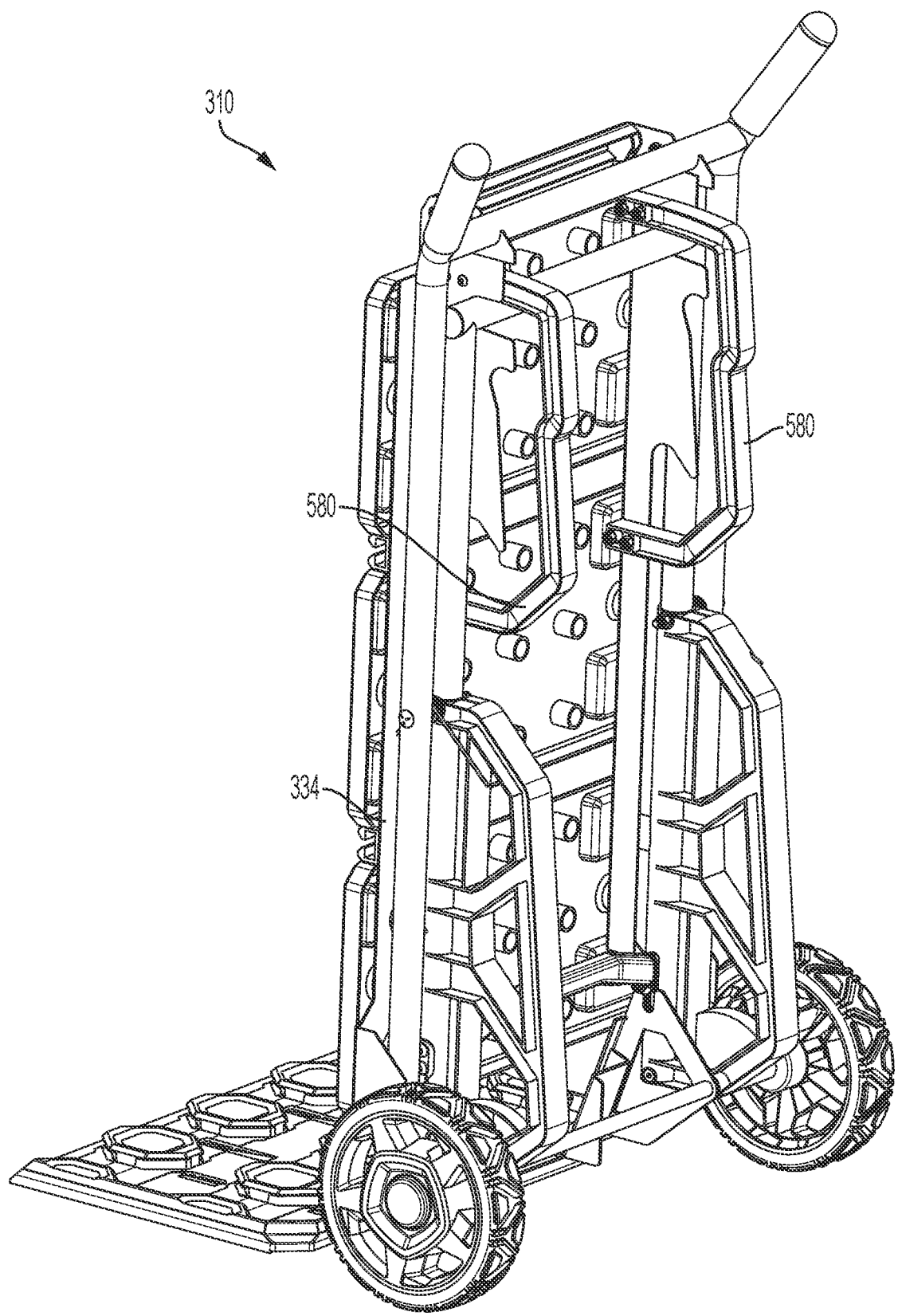
FIG. 16 is a perspective view of a workbench-hand truck assembly according to another embodiment of the present disclosure.
Figure 17:
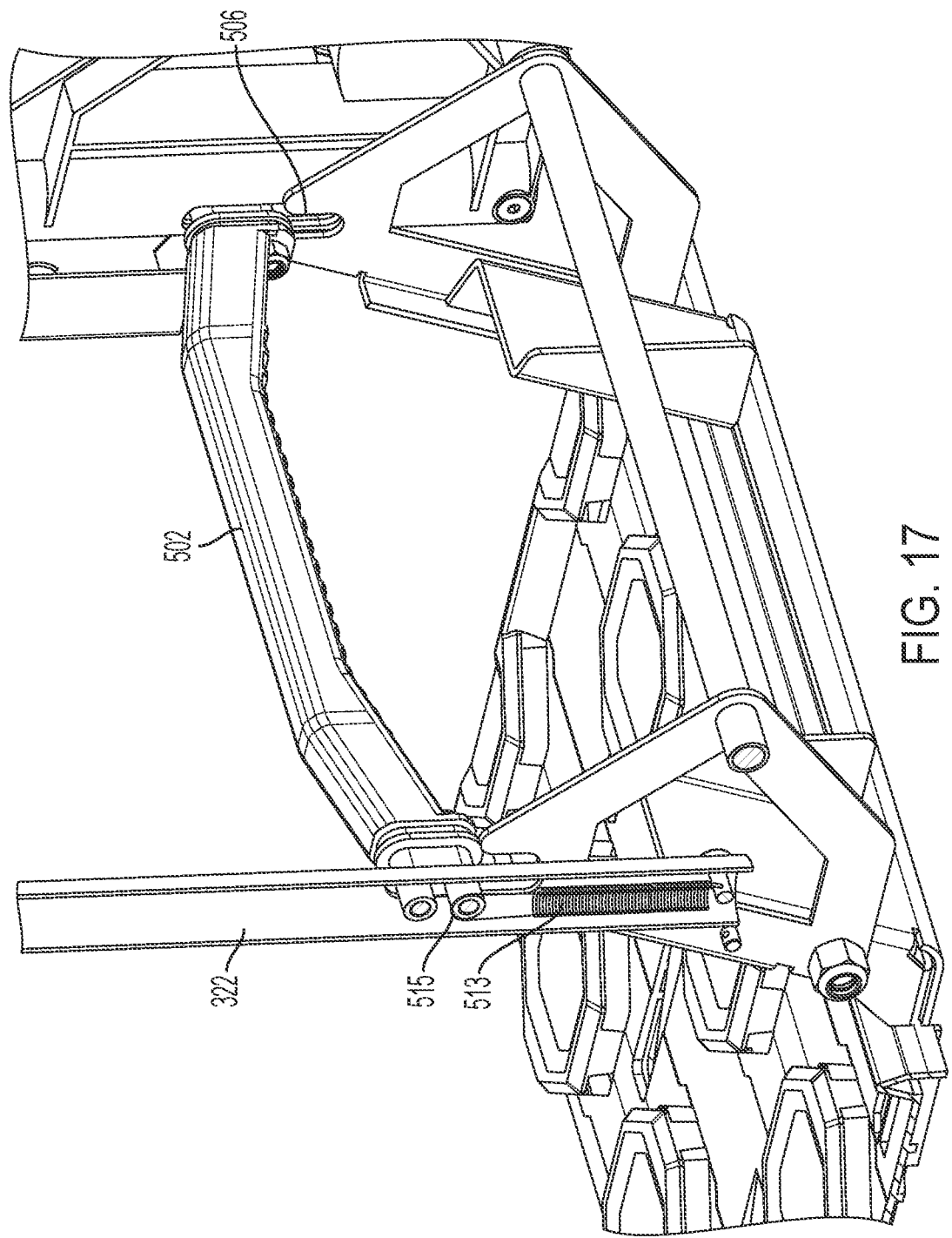
FIG. 17 is an enlarged cross-sectional view taken along line 17-17 in FIG. 15.

FIGS. 16-17 illustrate a workbench-hand truck assembly 310 according to another embodiment. The workbench-hand truck assembly 310 is similar to the workbench-hand truck assembly 10 described above with reference to FIGS. 1-15 and features and elements of the workbench assembly are given like reference numbers plus '300.' in addition, the following description focuses only on differences between the workbench-hand truck assembly 310 and the workbench-hand truck assembly 10 described above. It should be understood that features and elements of the workbench-hand truck assembly 10 may be incorporated into the workbench-hand truck assembly 310, and vice versa.

Referring to FIG. 16, the workbench-hand truck assembly 310 includes two contoured guide bars 580, in place of the guide wires 280 described above with reference to FIG. 14. The guide bars 580 may be made of a plastic material (e.g., an injection-molded plastic material) and coupled to the underside of the frame 334. The guide bars 580 may act as feet to at least partially support the workbench-hand truck assembly 310 when the workbench-hand truck assembly 310 is in the low table position, for example.

With reference to FIG. 17, the workbench-hand truck assembly 310 includes a thicker lock-bar 502, compared to the lock-bar 202 described above with reference to FIG. 13. The lock-bar 502 is preferably made of a plastic material (e.g., an injection-molded plastic), as the increased thickness of the lock-bar 502 provides additional strength. In addition, the pedal 216 is omitted, and the lock-bar 502 may be instead grasped by hand to move the lock-bar 502 from a locked position, in which the lock-bar 502 is received within the recesses 506, to an unlocked position (illustrated in FIG. 17), in which the lock-bar 502 is moved out of the recesses 506. Like the lock-bar 202. The lock-bar 502 is biased toward the locked position by one or more biasing members. More specifically, a coil spring 513 accommodated in each of the first legs 322 is coupled to a pin 515 at the end of the lock-bar 502 to bias the lock-bar 502 toward the locked position.

Various features of the invention are set forth in the following claims.

What is claimed is:

1. A workbench-hand truck assembly comprising:
   a first pair of legs;
   a frame;
   a second pair of legs pivotally coupled to the frame and to the first pair of legs;
   a workbench configured to be supported by the first and second pairs of legs;
   a pair of brackets pivotally coupled to the first pair of legs;
   a pair of wheels configured to support the workbench-hand truck assembly in the hand truck position;
   an axle rotatably supporting the wheels, wherein the axle extends through the pair of brackets; and
   a nose plate pivotally coupled to the pair of brackets for movement between a stored position, in which the nose plate extends parallel to and adjacent the workbench, and a deployed position, in which the nose plate extends away from the workbench,
   wherein the workbench-hand truck assembly is configurable in a hand truck position when the nose plate is in the deployed position, such that the nose plate extends perpendicular to the workbench,
   and wherein the workbench and the first and second pairs of legs are pivotable relative to the pair of brackets and the nose plate about the axle.

2. The workbench-hand truck assembly of claim 1, wherein the first pair of legs and the second pair of legs are movable between a first position, in which the workbench is positioned at a first height above a ground surface, and a second position, in which the workbench is positioned at a second height above the ground surface that is greater than the first height.

3. The workbench-hand truck assembly of claim 2, wherein the first pair of legs and the second pair of legs are movable to a third position, in which the workbench is positioned at a third height above the ground surface that is greater than the second height.

4. The workbench-hand truck assembly of claim 3, wherein the second height is between 20-inches and 28-inches, and wherein the third height is between 30-inches and 38-inches.

5. The workbench-hand truck assembly of claim 1, further comprising a skid platform removably coupled to the nose plate.

6. The workbench-hand truck assembly of claim 5, further comprising a container removably coupled to the skid platform, wherein the container includes a recess and the skid platform includes a detent that cooperates with the recess to retain the container on the skid platform.

7. The workbench-hand truck assembly of claim 5, wherein the skid platform includes a projection, and wherein the nose plate includes a groove configured to receive the projection in a snap-fit to couple the skid platform to the nose plate.

8. The workbench-hand truck assembly of claim 1, wherein the workbench includes a plurality of modular table sections removably coupled to the frame.

9. The workbench-hand truck assembly of claim 1, wherein the workbench includes a guide track configured to slidably receive a bar clamp to couple the bar clamp to the workbench.

10. The workbench-hand truck assembly of claim 1, further comprising a locking pin configured to retain the nose plate in at least one of the stored position or the deployed position.

11. The workbench-hand truck assembly of claim 1, herein each of the wheels has a diameter between 8-inches and 10-inches.

12. A workbench-hand truck assembly comprising:
a first pair of legs;
a frame;
a second pair of legs pivotally coupled to the frame and to the first pair of legs;
a pair of brackets pivotally coupled to the first pair of legs;
a nose plate pivotally coupled to the pair of brackets;
a workbench configured to be supported by the first and second pairs of legs, wherein the workbench is pivotable relative to the pair of brackets and the nose plate between a vertical position and a horizontal position; and
a locking member movable between a locked position, in which the locking member retains the workbench in the vertical position, and an unlocked position, in which the workbench is permitted to pivot toward the horizontal position,
wherein the locking member extends between the pair of brackets, and wherein the locking member is received in recesses in the pair of brackets when the locking member is in the locked position.

13. The workbench-hand truck assembly of claim 12, wherein, when the workbench is in the horizontal position, the first pair of legs and the second pair of legs are movable between a first position, in which the workbench is positioned at a first height above a ground surface, and a second position, in which the workbench is positioned at a second height above the ground surface that is greater than the first height.

14. The workbench-hand truck assembly of claim 13, wherein, when the workbench is in the horizontal position, the first pair of legs and the second pair of legs are further movable to a third, position, in which the workbench is positioned at a third height above the ground surface that is greater than the second height.

15. The workbench-hand truck assembly of claim 12, further comprising a foot pedal for moving the locking member toward the unlocked position.

16. A workbench-hand truck assembly comprising:
a first pair of legs;
a frame;
a second pair of legs pivotally coupled to the frame and to the first pair of legs;
a pair of brackets pivotally coupled to the first pair of legs;
a nose plate pivotally coupled to the pair of brackets;
a workbench configured to be supported by the first and second pairs of legs, wherein the workbench is pivotable relative to the pair of brackets and the nose plate between a vertical position and a horizontal position, and, wherein when the workbench is in the horizontal position, the first pair of legs and the second pair of legs are movable between a first position, in which the workbench is positioned at a first height above a ground surface, and a second position, in which the workbench is positioned at a second height above the ground surface that is greater than the first height;
a latch member movable between a latched position, in which the latch member retains the first pair of legs and the second pair of legs in the first position, and an unlatched position, in which the first pair of legs and the second pair of legs are movable toward the second position; and
a handle having a fixed portion and a movable portion, wherein the movable portion is movable toward the fixed portion to actuate the latch member from the latched position to the unlatched position.

* * * * *